(12) United States Patent
Richardson et al.

(10) Patent No.: US 9,842,332 B2
(45) Date of Patent: Dec. 12, 2017

(54) SYSTEMS AND METHODS FOR PROCESSING A FINANCIAL TRANSACTION

(71) Applicants: Brian Richardson, Loganville, GA (US); Govind Kothandapani, Snellville, GA (US)

(72) Inventors: Brian Richardson, Loganville, GA (US); Govind Kothandapani, Snellville, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 316 days.

(21) Appl. No.: 14/215,641

(22) Filed: Mar. 17, 2014

(65) Prior Publication Data

US 2014/0263630 A1 Sep. 18, 2014

Related U.S. Application Data

(60) Provisional application No. 61/802,318, filed on Mar. 15, 2013.

(51) Int. Cl.
*G06Q 20/32* (2012.01)
(52) U.S. Cl.
CPC ................. *G06Q 20/3276* (2013.01)
(58) Field of Classification Search
USPC ....................................................... 235/381
See application file for complete search history.

(56) References Cited

U.S. PATENT DOCUMENTS

| | | | | |
|---|---|---|---|---|
| 6,895,394 B1* | 5/2005 | Kremer | .................. | G06Q 20/02 705/64 |
| 8,769,289 B1* | 7/2014 | Kronrod | .................. | G06F 21/43 380/285 |
| 2007/0178883 A1* | 8/2007 | Nandagopal | ........... | G06Q 20/32 455/411 |
| 2009/0265776 A1* | 10/2009 | Baentsch | ................ | H04L 63/08 726/9 |
| 2013/0132234 A1* | 5/2013 | Grossi | .................... | G06Q 20/12 705/26.41 |

* cited by examiner

*Primary Examiner* — Michael G Lee
*Assistant Examiner* — David Tardif
(74) *Attorney, Agent, or Firm* — Next ip Law Group LLC; Minh N. Nguyen

(57) ABSTRACT

Systems and methods for processing a financial transaction are provided. A representative system of processing a financial transaction comprises a product dispensing device that encodes and outputs public transaction data related to a purchasable item. A portable computing device receives the public transaction data and encodes a payment data with the received public transaction data. A payment processing server receives and processes the encoded data, and determines whether a transaction can be completed based on the encoded data. Responsive to determining that the transaction is completed, the payment processing server generates and transmits an authentication data based on the encoded data. The portable computing device receives and outputs the authentication data. The product dispensing device receives the authentication data, verifies payment based on the received authentication data, and provides the purchasable item to a customer who is operating the portable computing device.

19 Claims, 5 Drawing Sheets

SYSTEMS AND METHODS FOR PROCESSING A FINANCIAL TRANSACTION

CROSS REFERENCE TO RELATED APPLICATIONS

This application is a nonprovisional patent application of copending U.S. provisional application entitled, "Multi-factor authentication via QR code," having Ser. No. 61/802,318, filed on Mar. 15, 2013, which is entirely incorporated herein by reference.

TECHNICAL FIELD

The present disclosure is generally related to financial transactions and, more particularly, is related to systems and methods for processing financial transactions using a portable computing device.

BACKGROUND

Many product dispensing devices or payment systems are still not connected to a network and thus, cannot currently perform any financial transaction using a credit card.

Desirable in the art is an improved system and method of processing a financial transaction that would improve upon the current payment systems.

SUMMARY

Systems and methods for processing a financial transaction are provided. A representative system of processing a financial transaction comprises a product dispensing device that encodes and outputs public transaction data related to a purchasable item. A portable computing device receives the public transaction data and encodes a payment data with the received public transaction data. A payment processing server receives and processes the encoded data, and determines whether a transaction can be completed based on the encoded data. Responsive to determining that the transaction is completed, the payment processing server generates and transmits an authentication data based on the encoded data. The portable computing device receives and outputs the authentication data. The product dispensing device receives the authentication data, verifies payment based on the received authentication data, and provides the purchasable item to a customer who is operating the portable computing device.

Other systems, devices, methods, features of the invention will be or will become apparent to one skilled in the art upon examination of the following figures and detailed description. It is intended that all such systems, devices, methods, features be included within the scope of the invention, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which a financial transaction and/or a dispensing of a product is completed.

Figure 1:
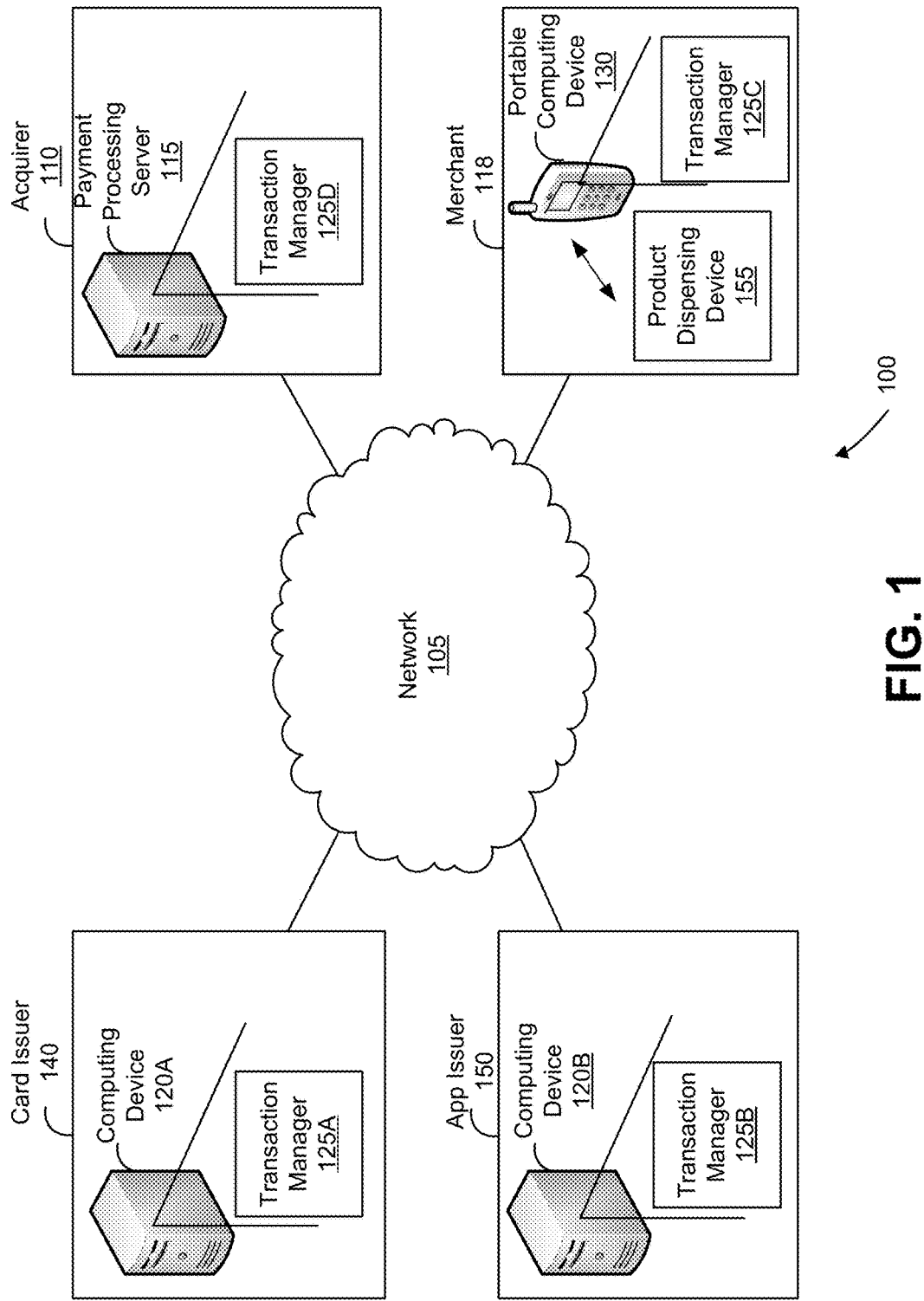
FIG. 1 is a block diagram that illustrates an embodiment of a system having a transaction manager that processes a financial transaction to activate a dispensing of a product.
Figure 3:
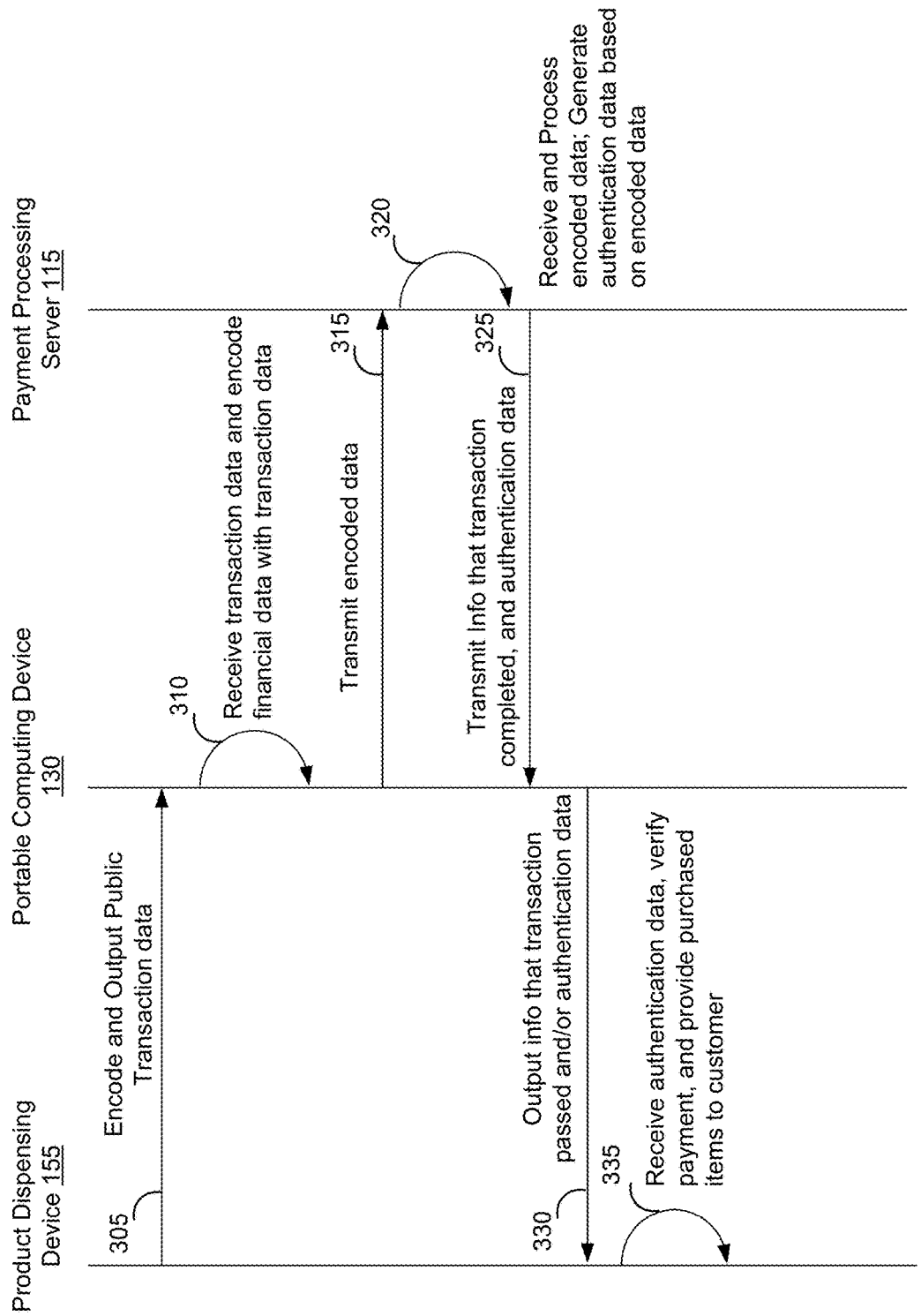
FIG. 3 is a high-level sequence diagram that illustrates an architecture, functionality, and/or operation of a transaction manager performing a financial transaction that involves a product dispensing device and a portable computing device in accordance with an embodiment of the present invention.

FIG. 1 is a block diagram that illustrates an embodiment of a system 100 having a transaction manager 125 that processes a financial transaction to activate a dispensing of a product 320 (FIG. 3). The system 100 can include payment processing server 115, portable computing device 130, and computing devices 120A-B at an acquirer premise 110, a merchant premise 118, a card issuer premise 140 and an application issuer premise 150. The portable computing device 130 can communicate with a product dispensing device 155 at the merchant premise 118. The product dispensing device 155 can dispense products, such as the soda, candy, police, etc.

The computing device 120-B and the portable computing device 130 can communication with a payment processing server 115 via a network 105, e.g., Internet, public switch telephone network, wide area network, etc. Each payment processing server 115, computing device 120-B, and portable computing device 130 can be installed with a transaction manager 125A-D. The transaction manager 125 provides instructions that can complete a financial transaction between the portable computing device 130 and the payment processing server 115 and dispense a product at a product dispensing device, such as a vending machine of 155 (FIG. 3). The transaction manager 125 can be executed through a cloud (not shown) that is part of the network 105 or at each computing device 120A-B, payment processing server 115, and a portable computing device 120C. The transaction manager 125 is further described in connection to FIGS. 2-8.

Prior to any transaction to be processed, the product dispensing device 155 is registered with the payment processing server 115. As part of the registration, the payment processing server 115 can generate two unique items per product dispensing device 155—1) a product dispensing device unique identifier 265 (FIG. 2) and a secret key 270

(FIG. 2), which both can be stored at the payment processing server 115 and product dispensing device 155. The dispensing device ID 265 can be used in transaction data 245 sent to and from the payment processing server 115. The secret key 270 should not be part of the public transaction data 245 sent to or from the payment processing server 115. A customer can establish an account with the payment processing server 115.

Figure 2:
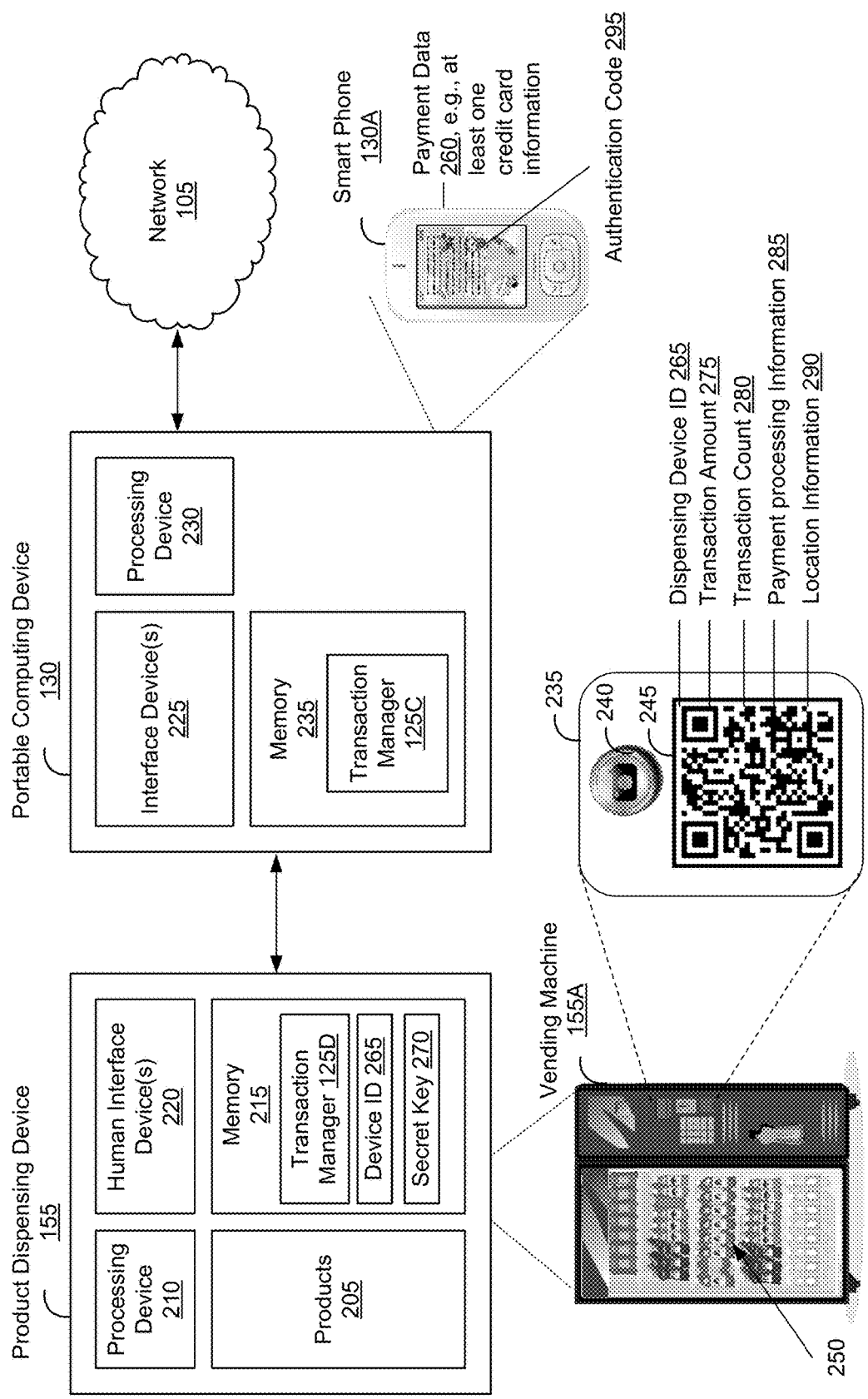
FIG. 2 is a block diagram of a product dispensing device and a portable computing device in accordance with an embodiment of the present invention.

FIG. 2 is a block diagram of a product dispensing device 155 and a portable computing device 130 in accordance with an embodiment of the present invention. The product dispensing device 155 includes a process device 210, memory 215 storing a transaction manager 125D, human interface device(s) 220, and products 250, such as soda, candy, toys, etc. The human interface device 220 can include some components of payment verification system, such as a quick response (QR) code scanner 240, low-cost B&W display (LCD or e-Paper) 235 and interface to the process device 210. The payment verification system is programmed with the dispensing device ID 265 and the secret key 270 prior to installation of the product dispensing device 155 at the merchant premise 118.

The display 235 can output the transaction data 245 in the form of, for example, a quick response (QR) code, that is encoded with data having the dispensing device ID 265, transaction amount 275, transaction count 280, payment processing information 285, and the location of the device 290. The dispensing device ID 265 can be a random generated number. The transaction amount 275 is the cost of the purchased item, such as $1.00 for a soda. The transaction count 280 is not number of transaction that the dispensing device has performed. The payment processing information 285 can include an acquirer information, banking information, merchant ID information, card issuer information, and application issuer information. The location information 290 can include the GPS location or location of the device at the merchant premise 118.

The portable computing device 130 can be a smart phone 130A, a digital wallet, a tablet, an iPad, and other similar portable devices. The portable computing device 130 can a human interface device 225, a processing device 230, and memory 235 that is store with a transaction manager 125C and payment data 260, e.g., at least one credit card information. Their human interface device 225 can include a camera, a display, a touch screen, keypads, and a microphone, all of which can be used to receive the transaction data 245 that is output by human interface device 220 of the product dispensing device 155. The display can output an authentication code 295 in the form of, for example, a QR code.

The memory 235 of the portable computing device 130 can also store payment date a 260, such as, one or more credit card information. The memory 235 of the portable computing device 130 can also store security and encryption algorithms for encrypting and decrypting financial transaction information as well as transmitting and receiving the financial transaction information to and from the payment processing server 115, all of which are known and appreciated by those skilled in the art. Similarly, the computing devices 120A-B, and payment processing server 115 includes the security and encryption algorithms, such as that described in connection to the portable computing device 130.

FIG. 3 is a high-level sequence diagram that illustrates an architecture, functionality, and/or operation of a transaction manager 125 performing a financial transaction that involves a product dispensing device 155 and a portable computing device 130 in accordance with an embodiment of the present invention. In step 305, the product dispensing device 155 encodes and outputs public transaction data 245 (FIG. 2) related to a purchasable item. In step 310, the portable computing device 130 receives the public transaction data 245 and encodes a payment data 260 (FIG. 2) with the received public transaction data 245. The encoded data can be a secret transaction data based on the public transaction data and payment data In step 315, the portable computing device 130 transmits the encoded data to the payment processing server 115. The payment processing server 115 receives and processes the encoded data. The payment processing server 115 determines whether a transaction can be completed based on the encoded data. Responsive to determining that the transaction is completed, the payment processing server 115 generates and transmits, in step 325, information that the financial transaction is completed and an authentication data based on the encoded data.

In step 330, the portable computing device 130 receives and outputs that the financial transaction is completed and authentication data in the form of, for example, the QR code 295. In step 335, the product dispensing device 155 receives the authentication data 295, verifies payment based on the received authentication data 295, and dispenses the purchasable item to a customer who is operating the portable computing device 130.

Figure 4:
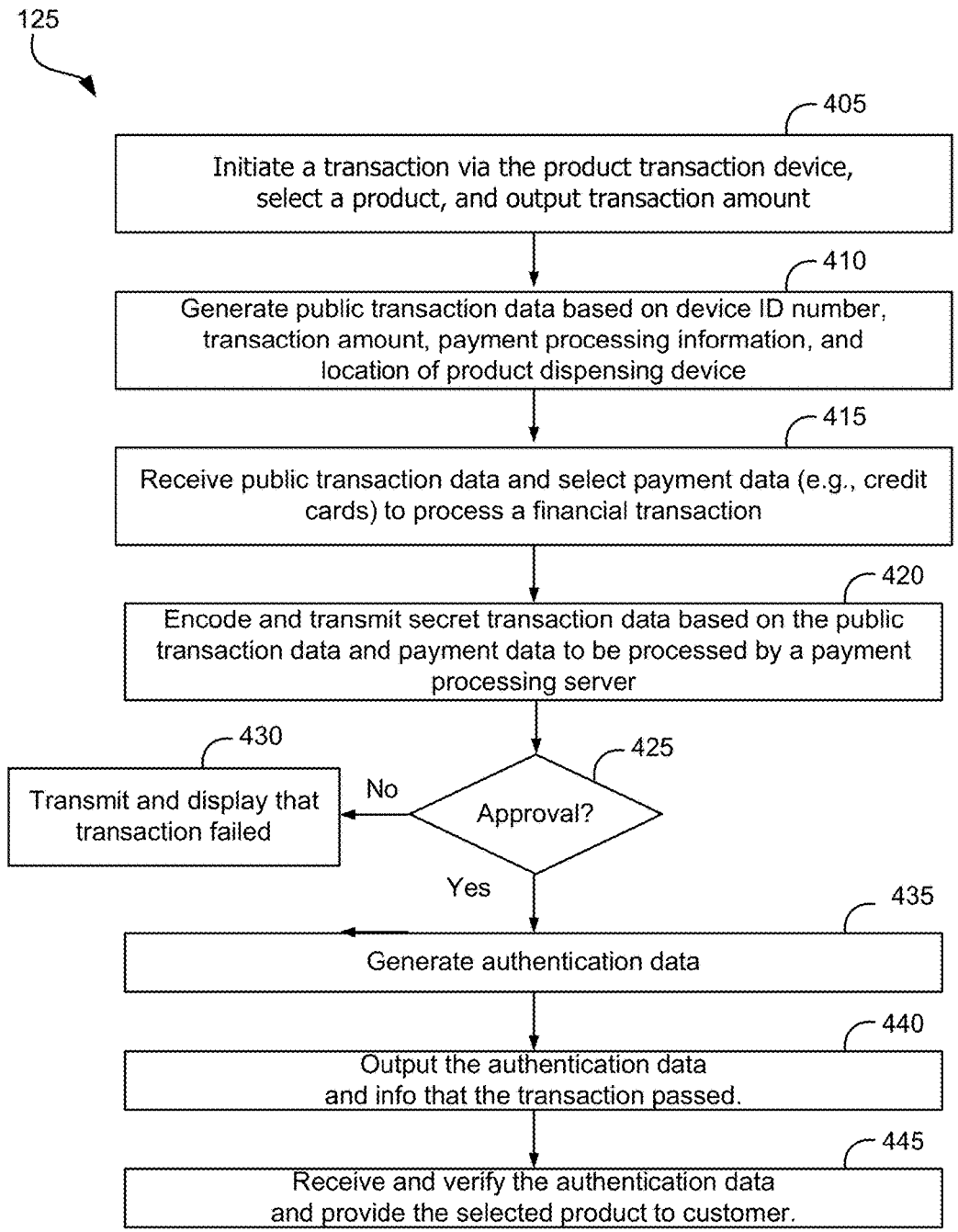
FIG. 4 is a flow diagram that illustrates the architecture, functionality, and/or operation of a transaction manager in accordance with the embodiment of the present invention.

FIG. 4 is a flow diagram that illustrates the architecture, functionality, and/or operation of a transaction manager 125 in accordance with the embodiment of the present invention. Beginning with block 405, the transaction manager 125 at the product dispensing device 155 initiates a transaction, receives a first interaction data related to the purchasable item that is being selected by a customer, and outputs a transaction amount 275 related to the selected purchasable item. For example, the customer interacts with the human interface device 220 of the product dispensing device 155 to select the purchasable item and then the transaction manager 125 can instruct the human interface device 220 to display the encoded public transaction data in the form of a QR code. In blocked 410, the transaction manager 125 generates a public transaction data 245 based on at least one of the following: the dispensing device ID 265 (FIG. 2), transaction amount 275, transaction count 280, payment processing information 285, and the location of the dispensing device 290.

In blocked 415, the transaction manager 125 at the portable computing device 130 receives the public transaction data 245 and a second interaction data related to the payment data 260 that is being selected by a customer to facilitate in processing a financial transaction. In block 420, the transaction manager 125 at the portable computing device 130 encodes the selected payment data with the received public transaction data 245 to form, for example, a secret transaction data that can be transmitted to the payment processing server 115. In block 425, the transaction manager 125 at the payment processing server 115 receives and processes the secret transaction data to determine whether the financial transaction can be completed.

If the financial transaction fails, the payment processing server 115 in black 430 transmits the "failed" message to the portable computing device 130, which is displayed on the display device of the portable computing device 130. If the financial transaction passes, the transaction manager at the payment processing server 115 in block 435 generates a first authentication data based on a secret key that is common between the product dispensing device 155 and the payment processing server 115. In block 440, the portable computing device 130 receives and outputs the first authentication data and information that the transaction passed. For example, the portable computing device 130 displays the message "transaction passed" and the first authentication data in the form of a QR code on a human interface device 225 of the portable computing device 130.

In block 445, the product dispensing device 155 receives and verifies the authentication data, and provides the selected products to the customer. In the example of a dispensing vending machine, said machine dispenses the products, such as a soda, to the customer. The product dispensing device 155 to generate another authentication data base on the common secret key and verifies payment of the purchasable item by matching the authentication day down from the payment processing server 115 and the other authentication data from the products dispensing device 155.

Figure 5:
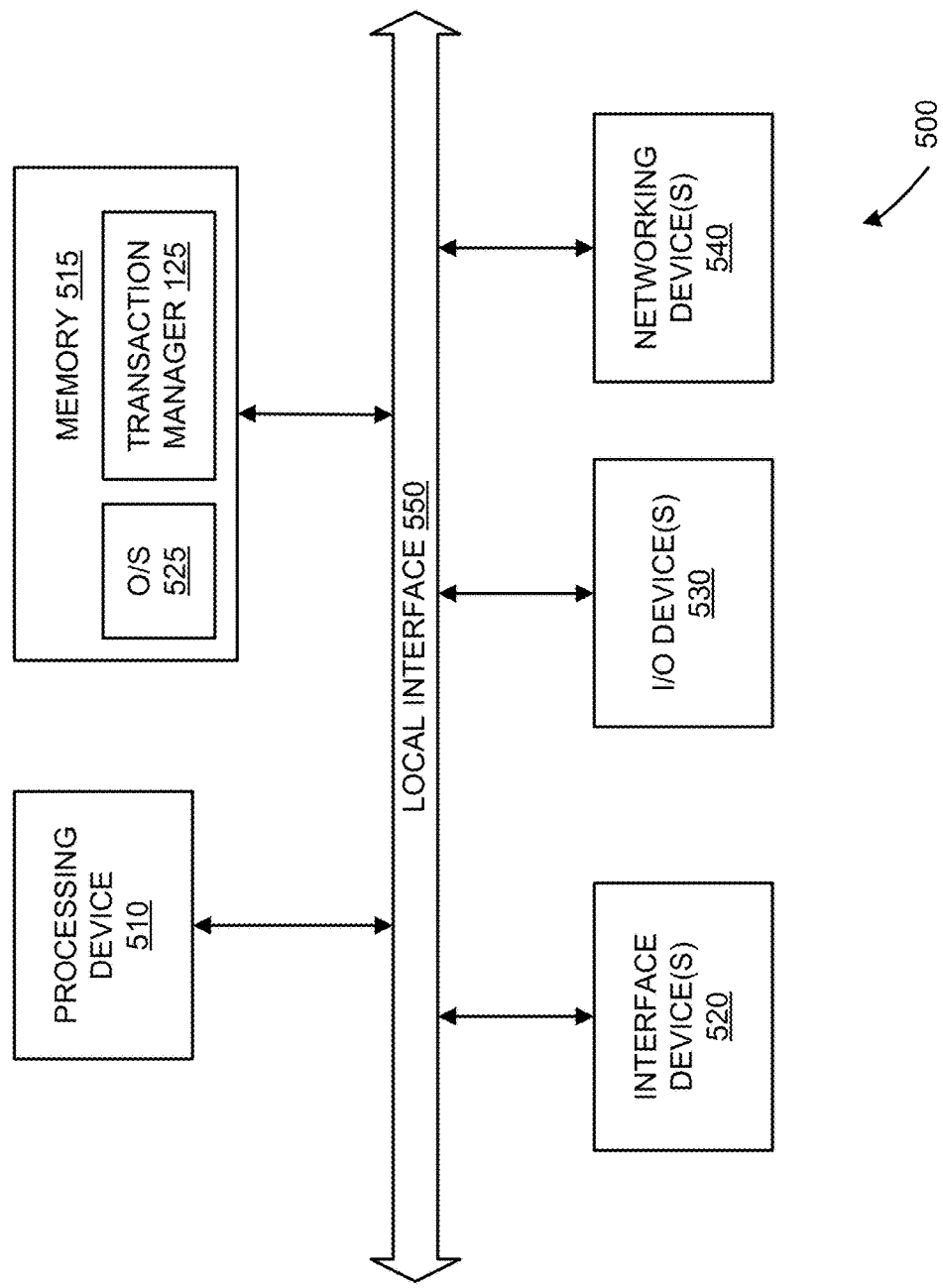
FIG. 5 is a block diagram illustrating an exemplary architecture for a generic computer 500 that is similar to the architecture of the computing device, portable computing device, product dispensing device, local server and central server, such as that shown in FIG. 1.

FIG. 5 is a block diagram illustrating an exemplary architecture for a generic computer 500 that is similar to the architecture of the computing device, portable computing device, product dispensing device, local server and central server, such as that shown in FIG. 1. As indicated in FIG. 5, the computing generic computer 500 comprises a processing device 510, data repository 515, one or more user interface devices 520, one or more I/O devices 530, and one or more networking devices 540, each of which is connected to a local interface 550. The processing device 510 can include any custom made or commercially available processor, a central processing unit (CPU) or an auxiliary processor among several processors associated with the generic computer 500, a semiconductor based microprocessor (in the form of a microchip), or a macroprocessor. The data repository 515 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 520 comprise those components with which the user (e.g., administrator) can interact with the generic computer 500. Where the generic computer 500 comprises a server computer or similar device, these components can comprise those typically used in conjunction with a PC such as a keyboard and mouse.

The one or more I/O devices 530 comprise components used to facilitate connection of the generic computer 500 to other devices and therefore, for instance, comprise one or more serial, parallel, small system interface (SCSI), universal serial bus (USB), or IEEE 1394 (e.g., Firewire™) connection elements. The networking devices 540 comprise the various components used to transmit and/or receive data over networks 510, 515, where provided. By way of example, the networking devices 540 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The data repository 515 normally comprises various programs (in software and/or firmware) including an operating system (O/S) 525 and the transaction manager 125, which has been described above. The O/S 525 controls the execution of programs, and provides scheduling, input-output control, file and data management, memory management, and communication control and related services.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present disclosure includes embodying the functionality of the preferred embodiments of the present disclosure in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Thereof, having thus described the disclosure, at least the following is claimed:

1. A system of processing a financial transaction, the system comprising:

a product dispensing device not connected to a data network that encodes and outputs public transaction data related to a purchasable item;

a portable computing device that receives the public transaction data and encodes a payment data with the received public transaction data; and a payment processing server that receives and processes the encoded data, wherein the payment processing server determines whether a transaction can be completed based on the encoded data, wherein responsive to determining that the transaction is completed, the payment processing server generates and transmits an authentication data based on the encoded data, wherein the portable computing device receives and outputs the authentication data, wherein the product dispensing device receives the authentication data, verifies payment based on the received authentication data, and provides the purchasable item to a customer who is operating the portable computing device.

2. The system as defined in claim 1, wherein the product dispensing device is initiated, receives a first interaction data related to the purchasable item that is being selected by a customer, and outputs a transaction amount related to the selected purchasable item.

3. The system as defined in claim 1, wherein the public transaction data is generated based on at least one of the following: a secret common key, device identification (ID) number, transaction amount, transaction count, payment processing information, and location of purchase being made.

4. The system as defined in claim 1, wherein the portable computing device receives a second interaction data related to the payment data that is being selected by a customer, wherein the selected payment data is encoded with the received public transaction data.

5. The system as defined in claim 4, wherein the payment data includes credit card information.

6. The system as defined in claim 4, wherein the encoded data is a secret transaction data based on the public transaction data and payment data.

7. The system as defined in claim 1, wherein the payment processing server is a server located at a location of an acquirer.

8. The system as defined in claim 1, wherein the authentication data is based on a secret key that is common between the product dispensing device and the payment processing server.

9. The system as defined in claim 8, wherein the product dispensing device generates another authentication data based on the common secret key, and verifies payment of the purchasable item by matching the authentication data from the payment processing server and the another authentication data from the product dispensing device.

10. A product dispensing device comprising:
a processing device;
at least one human interface device that is electrically coupled to the processing device;
memory that stores a transaction manager having instructions that are executed by the processing device, the instructions comprising the following logics:
encode public transaction data related to a purchasable item;
instruct the at least one human interface device to display the encoded public transaction data;
generate a first authentication data;

receive a second authentication data from a portable computing device;
verify payment of the purchasable item based on the first and second authentication data; and
responsive to verifying that the payment for the purchasable item has been completed, dispense the purchasable item to a customer who is operating the portable computing device;
wherein the product dispensing device is not connected to a network.

11. The product dispensing device as defined in claim 10, wherein the instructions comprising the following logics;
initiate a financial transaction;
receive a first interaction data related to purchasable item being selected; and
output a transaction amount related to the selected purchasable item.

12. The product dispensing device as defined in claim 10, wherein the public transaction data is generated based on at least one of the following: a secret common key, a device identification (ID) number, transaction amount, transaction count, payment processing information, and location of purchase being made.

13. The product dispensing device as defined in claim 10, wherein the first and second authentication data are based on a secret key that is common between the product dispensing device and the payment processing server.

14. A portable computing device that interacts with a product dispensing device and a payment processing server for processing a financial transaction, the portable computing device comprising:
a processing device;
at least one human interface device that is electrically coupled to the processing device;
memory that stores a transaction manager having instructions that are executed by the processing device, the instructions comprising the following logics:
receive a public transaction data from a product dispensing device not connected to a data network;
encode a payment data with the received public transaction data;
send the encoded data to a payment processing server;
receive and output an authentication data from the payment processing server to the product dispensing device.

15. The portable computing device as defined in claim 14, wherein the public transaction data is generated based on at least one of the following: a secret common key, device identification (ID) number, transaction amount, transaction count, payment processing information, and location of purchase being made.

16. The portable computing device as defined in claim 14, wherein the instructions comprising the logic: receive an interaction data related to the payment data being selected to encode the selected payment data with the received public transaction data.

17. The portable computing device as defined in claim 16, wherein the payment data includes credit card information.

18. The portable computing device as defined in claim 16, wherein the encoded data is a secret transaction data based on the public transaction data and payment data.

19. The portable computing device as defined in claim 14, wherein the authentication data is based on a secret key that is common between the product dispensing device and the payment processing server.

* * * * *